(12) United States Patent
Stephenson

(10) Patent No.: US 7,302,226 B2
(45) Date of Patent: Nov. 27, 2007

(54) COMBINED FIXED SATELLITE SERVICE AND MOBILE PLATFORM SATELLITE SERVICE COMMUNICATION SYSTEM

(75) Inventor: Gary V Stephenson, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 565 days.

(21) Appl. No.: 10/852,042

(22) Filed: May 24, 2004

(65) Prior Publication Data

US 2004/0219879 A1  Nov. 4, 2004

Related U.S. Application Data

(63) Continuation-in-part of application No. 09/844,473, filed on Apr. 27, 2001, now abandoned.

(51) Int. Cl.
*H04B 17/02* (2006.01)

(52) U.S. Cl. ............. 455/12.1; 455/427; 455/430; 455/320; 455/13.2; 455/13.3; 370/320; 370/342; 370/441; 370/316; 370/529; 370/395.21; 370/395.41; 370/468; 370/477

(58) Field of Classification Search ........ 455/12.1, 455/427, 430; 370/477, 395, 344, 316, 320, 370/529, 342, 441, 395.21, 395.41, 468
See application file for complete search history.

(56) References Cited

U.S. PATENT DOCUMENTS

| | | | | |
|---|---|---|---|---|
| 5,036,523 A * | 7/1991 | Briskman | ............. | 375/141 |
| 5,463,656 A * | 10/1995 | Polivka et al. | ............. | 375/130 |
| 5,572,216 A * | 11/1996 | Weinberg et al. | ...... | 342/357.06 |
| 5,651,050 A * | 7/1997 | Bhagat et al. | ............. | 455/431 |
| 5,678,171 A | 10/1997 | Toyama et al. | | |
| 5,978,652 A | 11/1999 | Burr et al. | | |
| 5,990,928 A * | 11/1999 | Sklar et al. | ............. | 725/72 |
| 6,018,659 A | 1/2000 | Ayyagari et al. | | |
| 6,020,845 A * | 2/2000 | Weinberg et al. | ............. | 342/354 |
| 6,032,041 A | 2/2000 | Wainfan et al. | ............. | 455/427 |
| 6,055,425 A | 4/2000 | Sinivaara | | |
| 6,097,752 A | 8/2000 | Wiedeman et al. | ......... | 375/130 |
| 6,147,980 A * | 11/2000 | Yee et al. | ............. | 370/316 |
| 6,160,994 A * | 12/2000 | Wiedeman | ............. | 455/12.1 |
| 6,201,797 B1 * | 3/2001 | Leuca et al. | ............. | 370/316 |

(Continued)

OTHER PUBLICATIONS

Mark E. Long, The Digital Satellite TV Handbook, newnespress, 1983 edition, pp. 1-4, chapter 1.*

(Continued)

*Primary Examiner*—Lana Le
*Assistant Examiner*—Amar Daglawi
(74) *Attorney, Agent, or Firm*—Harness, Dickey & Pierce, P.L.C.

(57) ABSTRACT

A communication system for a mobile platform satellite service (MPSS) system includes a receiver subsystem (RS) and a transmitter subsystem (TS). A satellite transponder is in communication with the RS and the TS of the mobile platform. A satellite service ground station includes a transmitter subsystem (TS) and a receiver subsystem (RS). A communication link is established between the MPSS system and the ground station, via the satellite transponder. The communications link includes fixed satellite service (FSS) data superimposed on MPSS data in the same frequency band to thereby maximize both satellite transponder utilization and interference budget usage.

17 Claims, 8 Drawing Sheets

U.S. PATENT DOCUMENTS

| | | | |
|---|---|---|---|
| 6,205,320 B1* | 3/2001 | Coleman | 455/13.1 |
| 6,272,317 B1* | 8/2001 | Houston et al. | 455/13.1 |
| 6,628,922 B1* | 9/2003 | Berger et al. | 455/13.1 |
| 6,636,734 B1* | 10/2003 | Berger et al. | 455/427 |
| 6,865,166 B1* | 3/2005 | Wilcoxson et al. | 370/330 |
| 6,975,837 B1* | 12/2005 | Santoru | 455/12.1 |
| 7,039,400 B2* | 5/2006 | Karabinis et al. | 455/427 |
| 7,054,593 B2* | 5/2006 | de La Chapelle et al. | 455/13.4 |
| 7,065,125 B1* | 6/2006 | Miller et al. | 375/130 |
| 7,068,975 B2* | 6/2006 | Loner | 455/12.1 |
| 2002/0041575 A1* | 4/2002 | Karabinis et al. | 370/319 |
| 2002/0098802 A1* | 7/2002 | Karabinis et al. | 455/13.1 |
| 2002/0152468 A1* | 10/2002 | Parkman | 725/63 |
| 2006/0209928 A1* | 9/2006 | Miller et al. | 375/146 |
| 2007/0087690 A1* | 4/2007 | Karabinis | 455/12.1 |

OTHER PUBLICATIONS

MArk E.Long, The Dlgital Satellite TV Handbook, newnespress, 1983 edition, pp. 1-4, Chapter 1.*

* cited by examiner

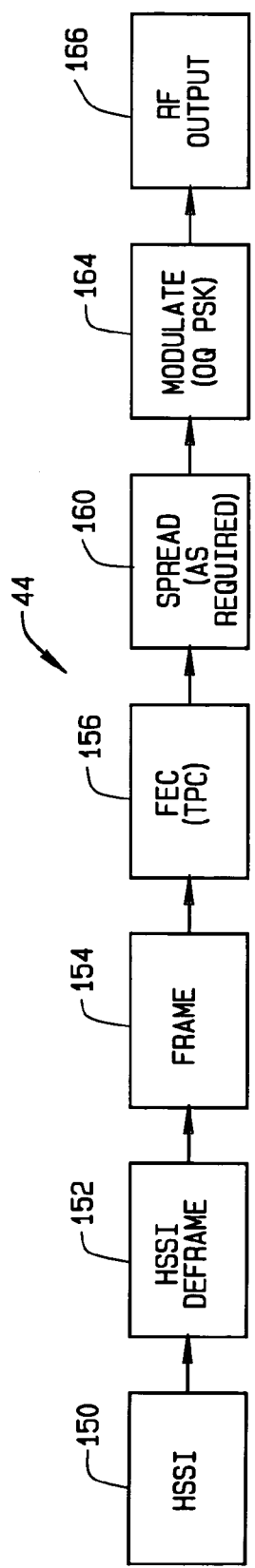
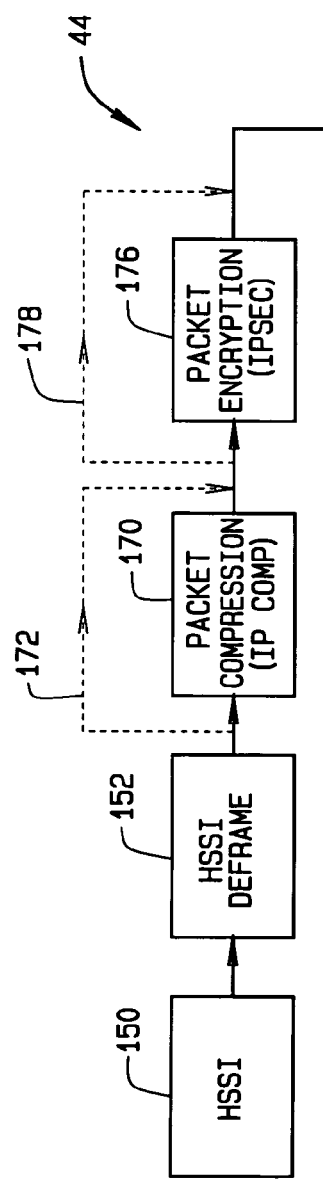
FIG. 3A
FIG. 3B

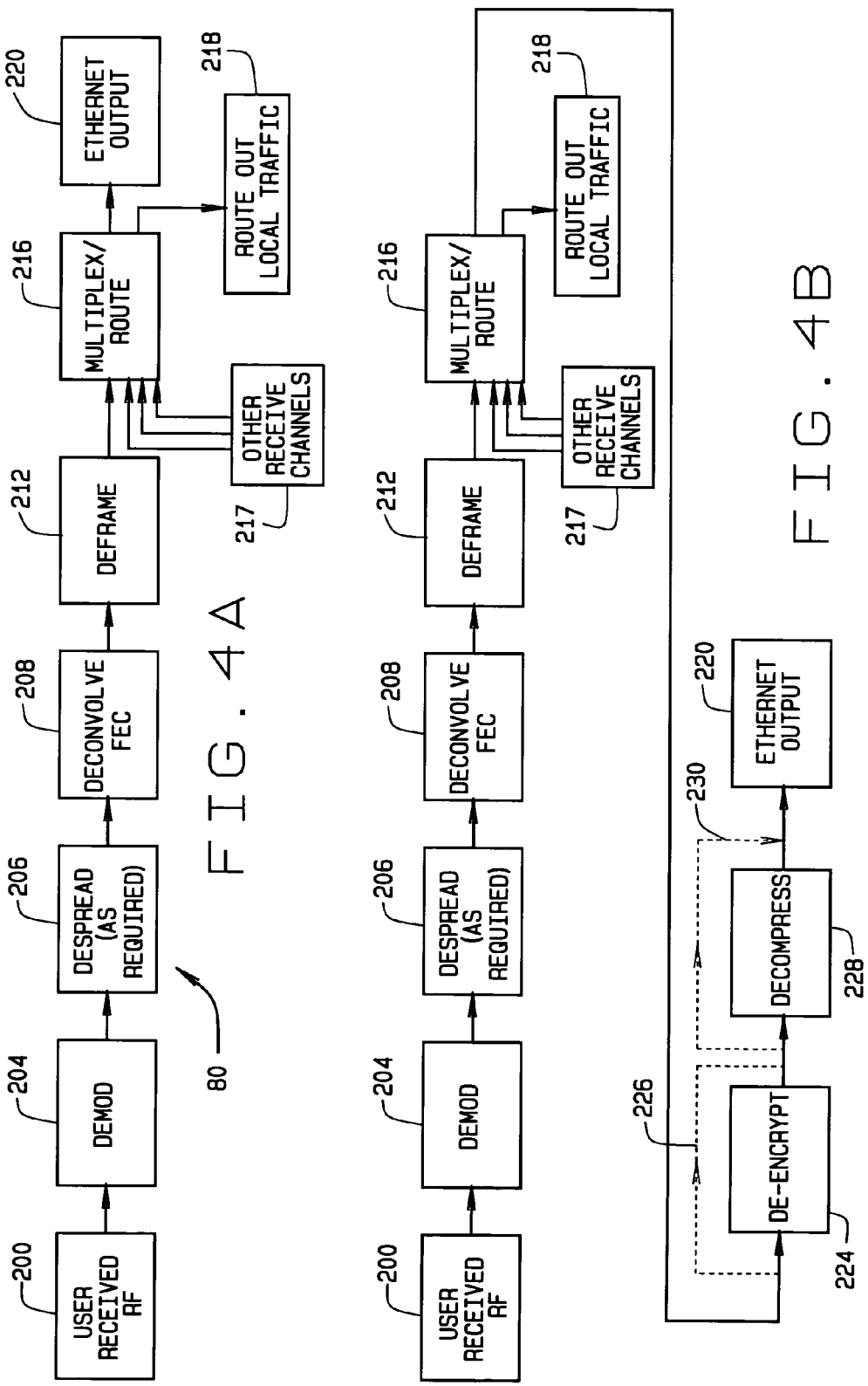

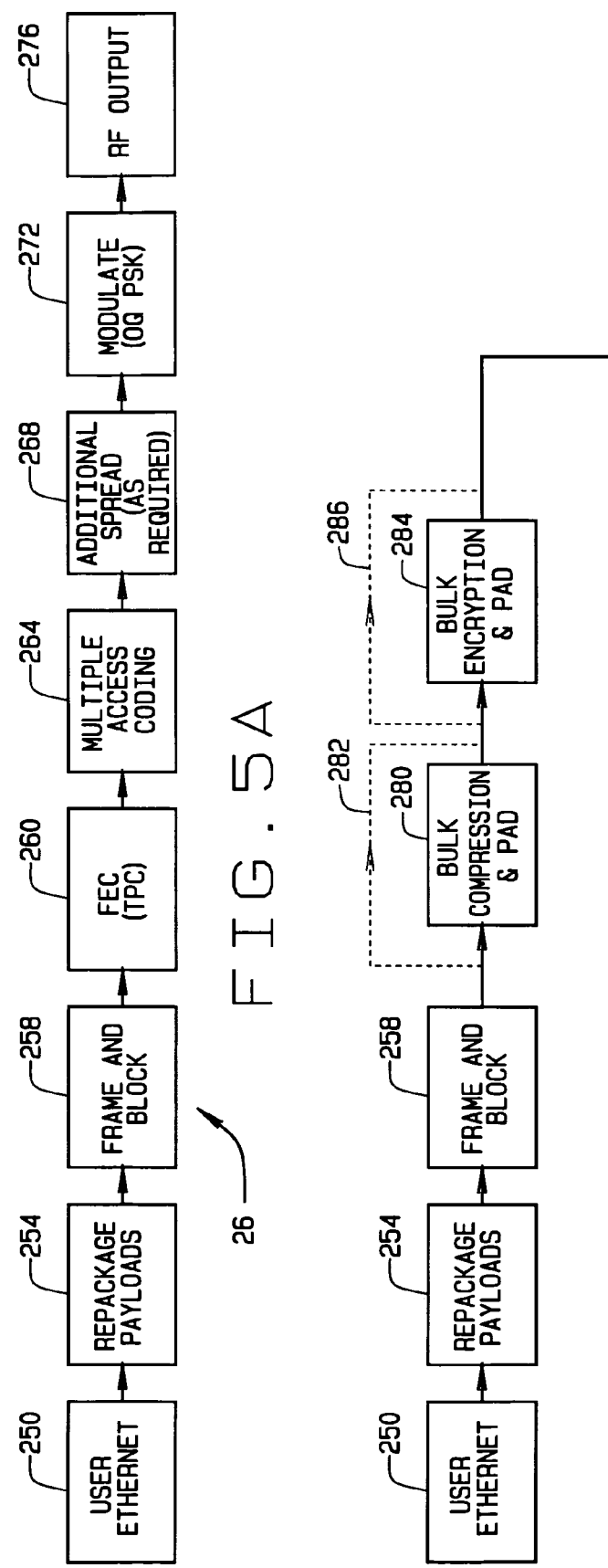
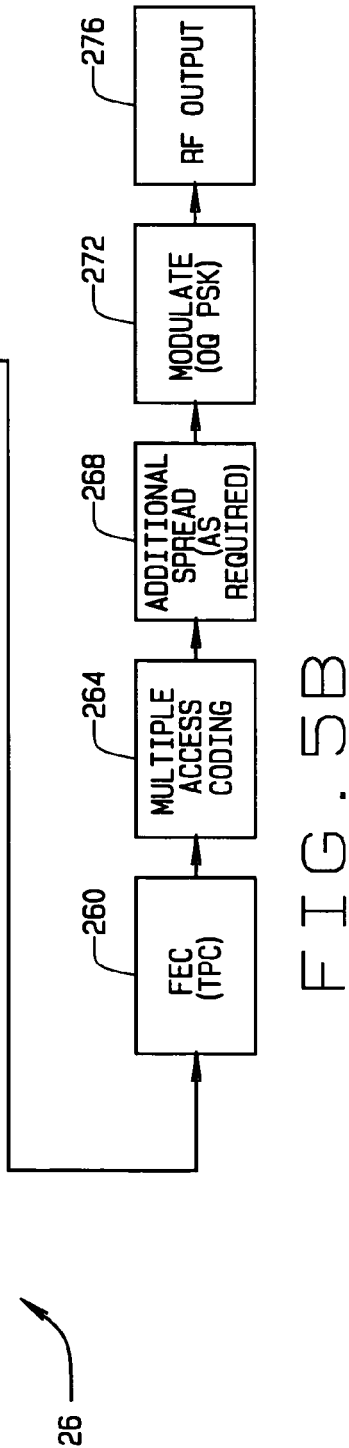
FIG. 5A
FIG. 5B

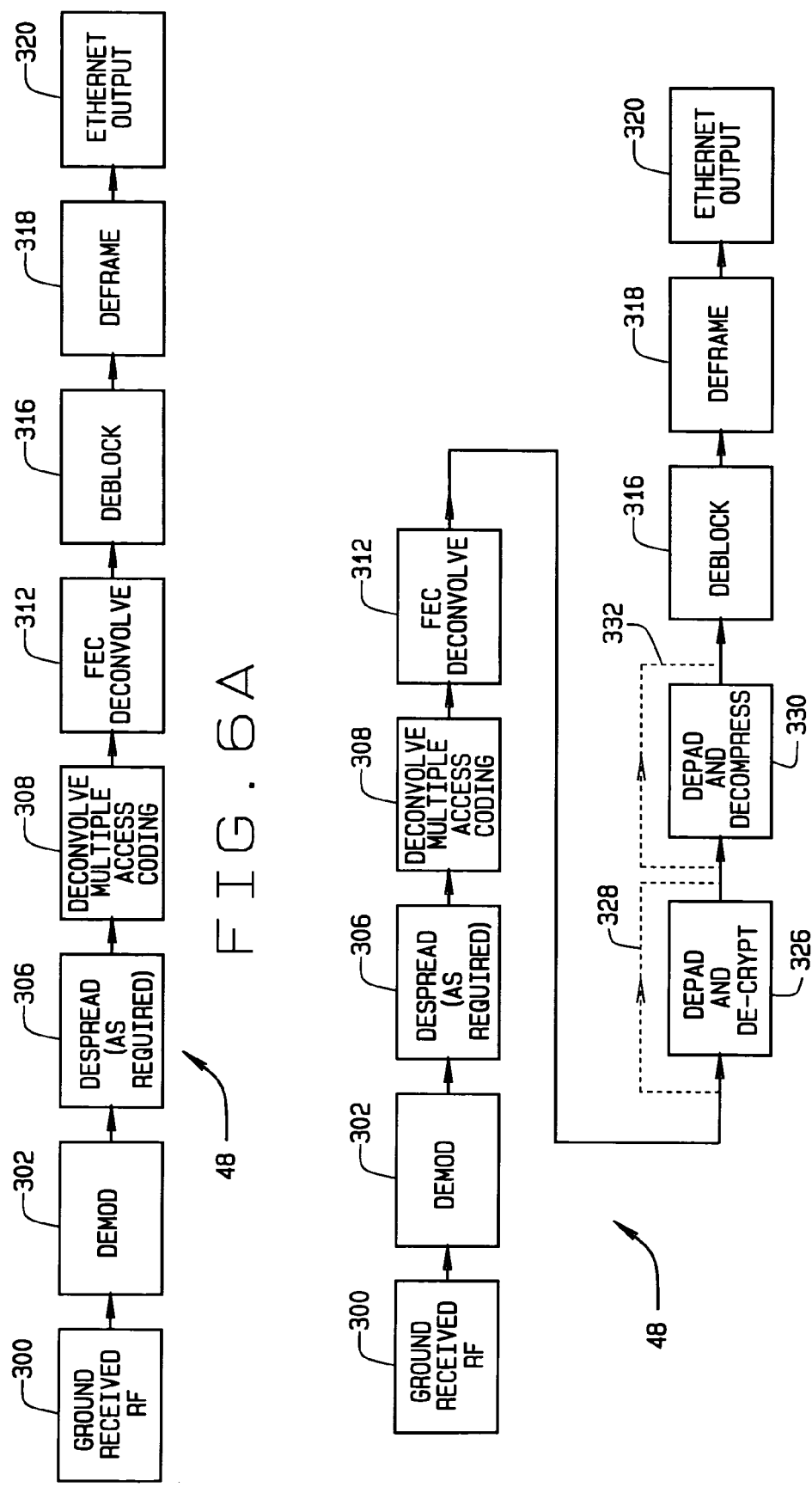

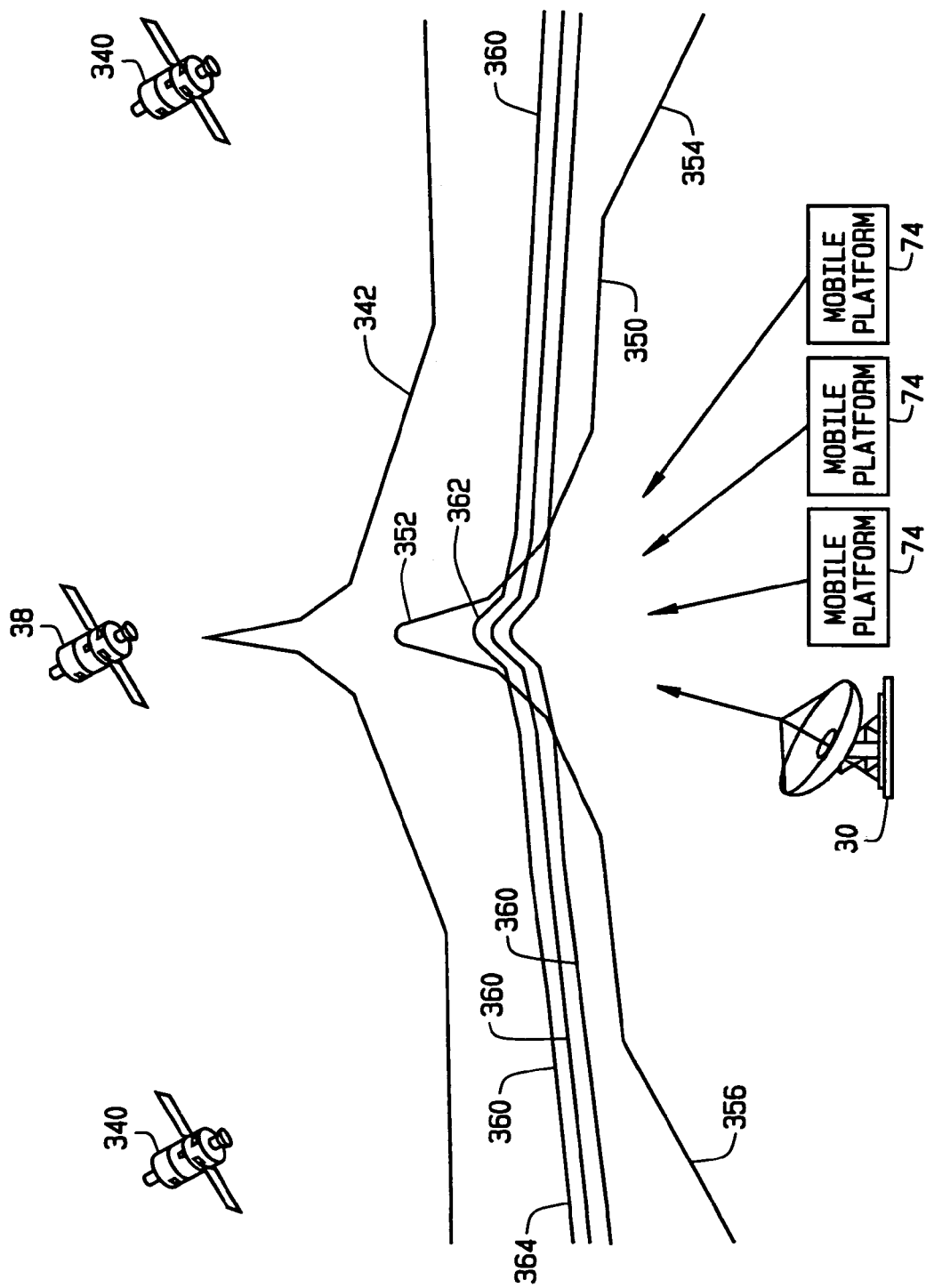

COMBINED FIXED SATELLITE SERVICE AND MOBILE PLATFORM SATELLITE SERVICE COMMUNICATION SYSTEM

CROSS REFERENCE TO RELATED APPLICATIONS

This application is a continuation-in-part of U.S. patent application Ser. No. 09/844,473 filed on Apr. 27, 2001, now abandoned the disclosure of the which is incorporated herein by reference.

FIELD OF THE INVENTION

The present invention relates to communication systems, and more particularly to communication systems for mobile platforms.

BACKGROUND OF THE INVENTION

Broadband communication access, on which our society and economy is growing increasingly dependent, has generally not been readily available to users on board mobile platforms such as aircraft, ships, trains, automobiles or handheld devices. While the technology exists to deliver the broadband communication services to mobile platforms, conventional solutions are commercially unfeasible due to the relatively high costs and/or due to low data rates. These conventional solutions have therefore only been available to government/military users and/or to high-end maritime markets such as cruise ships.

One obstacle limiting mobile platform broadband services has been the limited availability of bandwidth that is governed in the United States by the Federal Communications Commission (FCC) and other governing bodies outside the United States. For example, the FCC set aside the Ku bandwidth between 10.7 and 15.0 GHz for the Fixed Satellite Service (FSS) and the Ka bandwidth between 18.0 and 31.0 GHz. Current regulations require transmissions from a fixed location such as a ground station. When mobile platforms such as airplanes receive a FSS uplink, they typically use services such as Airphone® for the return, or down, link. The airplanes do not currently use FSS for the down link because airplanes are mobile and do not currently fall within the FCC rules. The Airphone® services fail to provide sufficient bandwidth on the return link for the typical user. Therefore, when passengers attempt to send large files, the connection time is prohibitive from cost and dwell time perspectives.

The FCC and other governing bodies also strictly limit the power spectral density (PSD) of communication systems providing data services on the Ku and Ka bands. In other words, the bandwidth, dynamic range, and interference patterns of communication systems providing data services on the Ku and Ka bands are restricted to prevent interference with other neighboring satellites.

Therefore, a broadband communication system that provides users with sufficient forward and return bandwidth for entertainment, Internet, e-mail and other services on board mobile platforms would be desirable. Additionally, it would be desirable to provide such forward and return bandwidth that will not cause interference with neighboring satellites.

SUMMARY OF THE INVENTION

A method for providing broadband communication for a mobile platform, according to preferred embodiment of the present invention, includes providing a first communications link between a mobile platform satellite service (MPSS) system transmitter subsystem (TS) and a satellite service ground station receiver subsystem (RS), via a target satellite transponder. The first communications link has a predetermined angular space and frequency space. A second communications link is provided between a MPSS system receiver subsystem (RS) and a fixed satellite service (FSS) station TS, via the target satellite transponder. At least a portion of an allowed interference budget for the target satellite transponder that is unused by FSS station TS is then utilized to provide additional interference budget for the MPSS system TS. Utilizing the unused interference budget of the FSS station TS maximizing the use of the allowed interference budget of the target satellite transponder with respect to at least one neighboring satellite while maximizing utilization of the target satellite transponder.

In accordance with another preferred embodiment of the present invention, a communication system for a mobile platform is provided. The system includes a mobile platform satellite service (MPSS) system that includes a transmitter subsystem (TS). The system additionally includes a target satellite transponder in communication with the TS and a satellite service ground station. The satellite service ground station includes a receiver subsystem (RS) that receives a return link from the satellite and the MPSS system. The return link includes fixed satellite service (FSS) data superimposed with MPSS data. The FSS data is superimposed with the MPSS data utilizing different multiple access codes for the FSS data and the MPSS data. The return link is within a return frequency band shared by the FSS and MPSS data. Superimposing the FSS data with the MPSS data within the same frequency band maximizes an allowed interference budget of the target satellite transponder with respect to at least one neighboring satellite while maximizing utilization of the target satellite transponder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 illustrates signal processing steps performed by a forward link ground transmitter subsystem (TS);

FIG. 4 illustrates signal processing steps performed by a forward link mobile platform receiver subsystem (RS) and/or by a FSS forward RS;

FIG. 5 illustrates signal processing steps performed by a return link mobile platform TS and/or a FSS return TS;

FIG. 6 illustrates signal processing steps performed by a return link ground RS;

FIG. 7 illustrates the power spectral density (PSD) of a combined MPSS and FSS signal.

DETAILED DESCRIPTION OF THE PREFERRED EMBODIMENTS

The following description of the preferred embodiment(s) is merely exemplary in nature and is in no way intended to limit the invention, its application, or uses.

Figure 1:
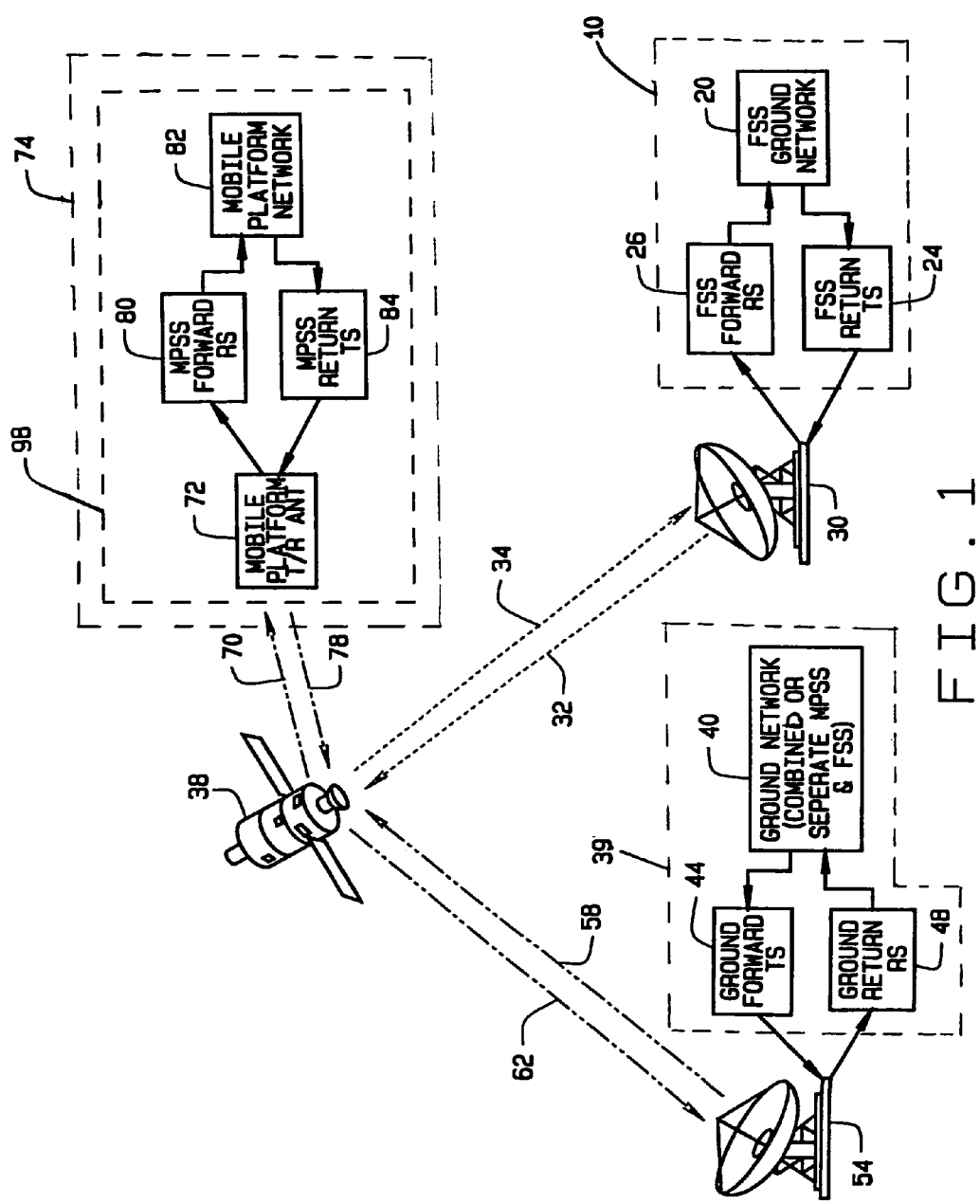
FIG. 1 illustrates a combined Mobile Platform Satellite Service (MPSS) and Fixed Satellite Service (FSS) system according to the invention.

Referring now to FIG. 1, a ground based fixed satellite service (FSS) station 10 includes a fixed satellite service (FSS) network 20 connected to a FSS return transmitter subsystem (TS) 24 and to a FSS forward receiver subsystem (RS) 26. The FSS return TS 24 and the FSS forward RS 26 are connected to an FSS antenna 30. The FSS return TS 24 and the FSS antenna 30 transmit a return link 32 to a satellite 38. The FSS forward RS 26 and the FSS antenna 30 receive a forward link 34, also referred to as down link, from the satellite 38.

A satellite service ground station 39 includes a ground network 40 connected to a ground forward TS 44 and a ground return RS 48. In a preferred embodiment, the ground station 39 is a combined Mobile Platform Satellite Service (MPSS) and FSS system. Alternatively the ground station 39 is separate MPSS and FSS systems. If the mobile platform is an airplane or ship, the MPSS may be referred to as the Aeronautical Mobile Satellite Service (AMSS). The ground forward TS 44 and the ground return RS 48 are connected to a MPSS antenna 54. The ground forward TS 44 and the MPSS antenna 54 transmit a forward link 58 to the satellite 38. The ground return RS 48 and the MPSS antenna 54 receive a return link from the satellite 38 via return link signals 62. Preferably, geosynchronous satellites are employed. Other types of satellite systems may also be employed. For example, medium and low earth orbit satellite systems may be employed. In such a case, the antennas 30 and 54 communicate with different satellites over time.

The antenna 54, via the satellite 38, transmit one or more forward links 58 and 70 to a MPSS system 98 onboard a mobile platform 74. More specifically, antenna 54 transmit the forward link(s) 70 to a transmit/receive antenna system 72 included in the MPSS system 98. Similarly, via the satellite 38, the antenna and 54 receive one or more return links 62 and 78 from the MPSS system 98 utilizing the transmit/receive antenna system 72. The MPSS system 98 includes a MPSS forward RS 80 and a MPSS return TS 84 that are connected to a mobile platform network 82.

In use, the ground forward TS 44 provides multimedia content such as movies on demand, Internet services, phone service, music videos, and other data services to the mobile platform 74 via the satellite 38. The MPSS forward RS 80, the MPSS return TS 84, the ground forward TS 44 and the ground return RS 48 provide broadband communications such as Internet access to passengers on the mobile platform 74. The FSS antenna 30 signal may be combined with the MPSS antenna 72 signal on the same satellite transponder 38. As will be described further below, the MPSS and FSS signals share the same bandwidth, via sharing return up links 78 and 32 such that the return down link 62 is a combination of both. More specifically, the MPSS and the FSS signals share the same angular space and frequency space. The present invention also takes advantage of the ability to increase the dish size of the FSS antenna 30 to increase the main lobe and decrease the side lobes of the FSS signals 32 and 34. The AMSS system is partially limited by the antenna that can be carried by the mobile platform 74.

In one preferred implementation, the FSS services provided by the FSS station 10 are located in the Ku band that lies between 10.7 and 15.0 GigaHertz (GHz). For example, in the United States, the forward up link 32 lies between 14.0 and 14.5 GHz and the return down link 34 lies between 11.7 and 12.2 GHz. In another preferred implementation, the FSS services are located in the Ka band that lies between 18.0 and 31.0 GHz. For example, in the United States, the forward up link 32 lies between 27.0 and 30.0 GHz and the return down link 34 lies between 18.3 and 21.2 GHz. Europe and other continents have different forward and return link frequency ranges in the Ku and Ka bands.

Figure 2:
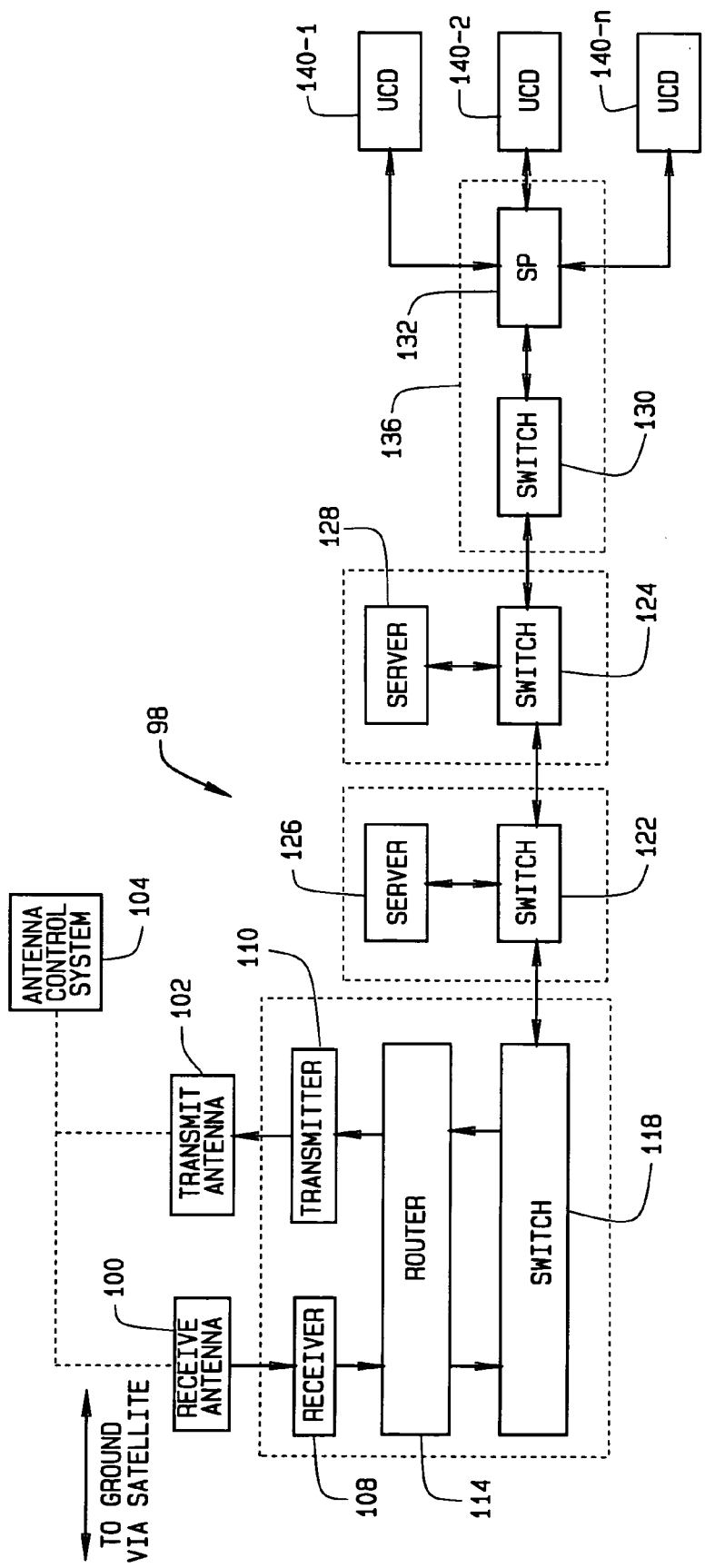
FIG. 2 illustrates an exemplary mobile platform receiver transmitter subsystem (RTS) and a mobile platform passenger network.

Referring now to FIG. 2, an exemplary embodiment of the MPSS system 98 for the mobile platform 74 is illustrated. The transmit and receive antenna system 72 includes a receive antenna 100 and a transmit antenna 102 that are controlled by an antenna control system 104. The receive antenna 100 is connected to a receiver 108 and the transmit antenna 102 is connected to a transmitter 110. The receiver 108 and the transmitter 110 are connected to a router 114 that is connected to a switch 118.

The switch 118 is connected to one or more additional switches 122 and 124 that are associated with servers 126 and 128. The switch 124 is connected to a switch 130 that is associated with a seat processor 132. The switch 130 and the seat processor 132 are generally referred to as a seat electronic box (SEB) 136. Seat processor 132 is typically connected to one or more user communication devices (UCD's) 140-1, 140-2, . . . , 140-n.

The user communication devices 140 are preferably a laptop, a personal digital assistant (PDA), or any other electronic device that includes a processor, memory, and an input/output interface. Each UCD 140 further includes a browser such as Internet Explorer®, Netscape Navigator® or any other suitable browser. Each UCD 140 may be supplied by the operator of the mobile platform 74. Each UCD 140 can be integrated with seat entertainment electronics. Skilled artisans can appreciate that the mobile platform network 82 can be varied without departing from the spirit and the scope of the invention. The servers 126 and 128 are typically associated with mobile platform interface electronics, web services, media services, and other onboard services.

Referring now to FIG. 3A, signal path functions for the ground forward TS 44 that generates the forward link 58 that contains MPSS combined, or superimposed, with FSS services are illustrated in greater detail. The ground forward TS 44 receives data on a high-speed serial interface (HSSI) from the ground network 40, as indicated at 150. The ground forward TS 44 then deframes the HSSI signal and applies a forward error correction (FEC) function as indicated at 152 and 156. In a preferred embodiment, turbo product code (TPC) FEC is employed. Other types of FEC such as Reed Solomon FEC can be employed as well.

At 160, the ground forward TS 44 optionally employs spread spectrum techniques to increase the data rates if required. Preferably, direct sequence spread spectrum is employed if spread spectrum techniques are used. As indicated at 164, the signal is modulated. In a preferred embodiment, the signal is modulated using offset quadrature (OQ) phase shift keying (PSK). As indicated at 166, the ground forward TS 44 and the antenna 54 transmit the RF signal to the satellite 38, via forward link 58.

In a preferred implementation, when multiple MPSS systems 98 and/or multiple FFS stations 10 are being used functions 150 through 164 are duplicated for each MPSS system 98 and/or FFS station 10. In this case, a unique code is assigned for each MPSS system 98 and/or FFS station 10 at the spread spectrum function 160. Code assignments are consistent with the multiple access approach that is used, for example, CDMA or CRMA. The unique codes are assigned in the same manner for any mix of FSS stations 10 and/or MPSS systems 98. Alternatively, one channel is used for the data of all MPSS systems 98 and/or FFS stations 10 and the data is divided among the MPSS systems 98 and/or FFS stations 10 by assigning different destination IP address ranges.

Referring now to FIG. 3B, reference numerals from FIG. 3A will be used for purposes of clarity to identify the same functions. Additional functions may be performed by the ground forward TS 44. After function 152, a packet compression function 170 employing Internet Protocol (IP) compression is optionally performed. Alternately, a bypass function 174 may be performed. In addition, a packet encryption function 176 is optionally performed. Alternately, a bypass function 178 may be performed.

Referring now to FIG. 4A, the signal path functions for the MPSS forward RS 80 and the FSS forward RS 26 are illustrated in greater detail. The following discussion will only refer to the MPSS forward RS 80 to simplify the discussion. As indicated at 200, the RF signal from the ground forward TS 44 is received, via the satellite 38. As indicated at 204, the RF signal is demodulated. As indicated at 206, the MPSS forward RS 80 despreads if spread spectrum is performed by the ground forward TS 44. As indicated at 208, the MPSS forward RS 80 deconvolves the FEC by applying an inverse function of the FEC employed by the ground forward TS 44. As indicated at 212, the MPSS forward RS 80 deframes the signal to remove padding bits and other artifacts of encoding performed by the ground forward TS 44.

As indicated at 216, the MPSS forward RS 80 performs multiplex/routing. Other receive channels that are similar to the channel shown (and identified by elements 200-212 in FIG. 4A) are provided as inputs at 217. Local traffic for system control (such as key exchange, (DAMA) rate changes, and power control) is removed at 217. As indicated at 220, an Ethernet output is provided to the mobile platform network 82.

Similarly, the FSS forward RS 26 receives the RF signal from the ground forward TS 44, via satellite 38. The FSS forward RS 26 then demodulates, despreads, deconvolves, deframes, performs multiplexing/routing and provides an Ethernet output to the FSS network 20. The signal path functions 200 through 220 are duplicated for each MPSS system 98 and/or FFS station 10. It should be noted that in a multiple MPSS system 98 and/or multiple FFS station 10 environment, more than one MPSS system 98 and/or FFS station 10 will be receiving the same RF signal 200 from the satellite transponder 38. Thus, the data is divided among the MPSS systems 98 and/or FFS stations 10. In one preferred implementation, each signal path 200 through 216 for each MPSS system 98 and/or FFS station 10 will not forward any data at 216 unless it carries the correct destination IP address range. Alternatively, the despread function 206 will only pass data that has been encoded with the correct multiple access code, e.g. CDMA and CRMA.

Referring now to FIG. 4B, reference numerals from FIG. 4A will be used for purposes of clarity to identify the same functions. Additional signal processing functions may be performed by the MPSS forward RS 80. After function 216, a de-encryption function 224 is optionally performed. Alternately, a bypass function 226 is performed. As indicated at 228, a decompression function is optionally performed. Alternately, a bypass function 230 is performed.

Referring now to FIG. 5A, the signal path functions for the FSS return TS 24 and the MPSS return TS 84 are shown in greater detail. The following discussion will only refer to the FSS return TS 24 to simplify the discussion. As indicated at 250, the FSS return TS 24 receives a user Ethernet signal is from the FSS network 20. As indicated at 254, the FSS return TS 24 repackages the payloads. As indicated at 258, the FSS return TS 24 performs framing and blocking. As indicated at 260, the FSS return TS 24 applies FEC such as TPC or other suitable FEC functions. As indicated at 264, the FSS return TS 24 performs multiple access coding. In a preferred embodiment, code division multiple access (CDMA), frequency division multiple access (FDMA), time division multiple access (TDMA), code reuse multiple access (CRMA), or any other suitable multiple access coding is employed. Another suitable multiple access coding method is disclosed in U.S. Pat. No. 5,103,459, which is hereby incorporated by reference.

As indicated at 268, the FSS return TS 24 employs spread spectrum to increase the data rate if required. As indicated at 272, the FSS return TS 24 modulates the signal. Preferably, the modulation is OQ PSK or other suitable modulation. As indicated at 276, the FSS return TS 24 provides an RF output signal to the FSS antenna 30.

Similarly, the MPSS return TS 84 receives an Ethernet signal from the mobile platform network 82. The MPSS return TS 84 then repackages, frames, blocks, applies suitable FEC functions, perform multiple access coding, employs spread spectrum, modulates and outputs an RF signal to the satellite transponder 38.

The signal path functions 250 through 276 are duplicated for each FSS station 10 and/or MPSS system 98. It should be appreciated that in a multiple MPSS system 98 and/or multiple FFS station 10 environment data from more than one MPSS system 98 and/or FFS station 10 will be transmitted to the same satellite transponder. Therefore, a different multiple access coding, e.g. CDMA or CRMA or any other suitable multiple access coding, is used at 264 for each mobile platform 74 and/or FSS antenna 30 signal. The number and mix of MPSS systems 98 and/or FFS stations 10 allowed on one return transponder, e.g. transponder 38, will be selected to maximize the use of the transponder power budget and nearest neighbor interference budget. In general, FSS stations 10 require more power budget, and MPSS systems 98 require more interference budget.

Referring now to FIG. 5B, reference numerals from FIG. 5A have been used for purposes of clarity to identify the same functions. Additional signal processing functions may be performed by the FSS return TS 24. After function 258, the FSS return TS 24 optionally performs bulk compression and padding, as indicated at 280. Alternately, a bypass function 282 is performed. The FSS return TS 24 optionally performs bulk encryption and padding, as indicated at 284. Alternately, a bypass function 286 is performed.

Referring now to FIG. 6A, the signal path functions of ground return RS 48 is illustrated in greater detail. As indicated at 300, the ground return RS 48 receives the RF signal. As indicated at 302, the ground return RS 48 demodulates the RF signal from the MPSS return TS 84 on the mobile platform 74. As indicated at 306, the ground return RS 48 despreads the signal if spread spectrum is used by the MPSS return TS 84. As indicated at 308, the ground return RS 48 deconvolves the multiple access coding that is employed by the FSS forward RS 26. As indicated at 312, the ground return RS 48 deconvolves the FEC by applying an inverse FEC function. As indicated at 316 and 318, the ground return RS 48 deblocks and deframes the signal, respectively. As indicated at 320, the ground return RS 48 provides an Ethernet output to the ground network 40.

Referring now to FIG. 6B, reference numbers from FIG. 6A will be used for purposes of clarity to identify the same functions. Additional signal processing functions may be performed by the ground return RS 48. After function 312, the ground return RS 48 optionally depads and de-encrypts the signal as indicated at 326. Alternately, a bypass function 328 is performed. As indicated at 330, the ground return RS 48 optionally depads and decompresses the signal. Alternately, a bypass function 332 is performed.

As can be appreciated from the foregoing, the mobile platform communication system optionally employs asymmetric compression and encryption on the forward and return links, i.e. up links and down links respectively. The up links employ IP-packet based compression and encryption and the down links employ bulk compression and encryption. FSS-only antennas 30 use the same forward and return link bandwidths as the MPSS system(s) 98 but with different receiver subsystems (RS) and different multiple access codes, for example CDMA or CRMA. Each FSS station 10 and MPSS system 98 also have a unique IP address range, which can be used as an alternative multiple access technique to sort data with respect to each user.

Referring now to FIG. 7, the power spectral density (PSD) of the combined MPSS and FSS signals on return links 78/62 and 32/62 and 6 between the MPSS system 98 and the satellite 38, between the FSS system 10 and the satellite 38, and between the satellite 38 and the antenna 54 are illustrated. Generally, FSS signals have a stronger main lobe, while MPSS signals tend to have stronger side lobes due to the generally smaller mobile platform antennas, i.e. T/R antenna 72. The target satellite transponder 38 and the neighboring satellite transponders 340 are illustrated in relation to an idealized aggregate PSD limit 342 per transponder. The idealized aggregate PSD limit 342 is determined by combining an idealized PSD 350 for FSS signals from the FSS station(s) 10 with an idealized PSD 360 for MPSS signals from the MPSS system(s) 98.

The idealized PSD 350 for FSS signals typically has a high main lobe 352 and low side lobes 354 and 356. The main lobe 352 can be optimized because the FSS station 10 is ground based. Therefore, the dish size, signal strength and directivity of ground based antenna, such as those of antennas 30 and 54, can be controlled more readily than mobile platform antennas. In contrast, the idealized PSD 360 for MPSS signals typically has a relatively low main lobe 362 and relatively high side lobes 364 and 366. The particular ratio of combined FSS data and MPSS data included in a transmission link, e.g. the return links 78/62 and 32/62 from the mobile platform(s) 74 and the FSS station(s) 10 to the satellite transponder 38 and then to the antenna 54, is based on the PSD aggregate budget 342. That is, the amount of FSS data superimposed with the MPSS data on a return up link is selected to maximize main lobe, i.e. main beam power, and side lobe emissions, i.e. nearest neighbor satellite interference, to match the maximum allowed as represented by the PSD aggregate budget 342.

Figure 8:
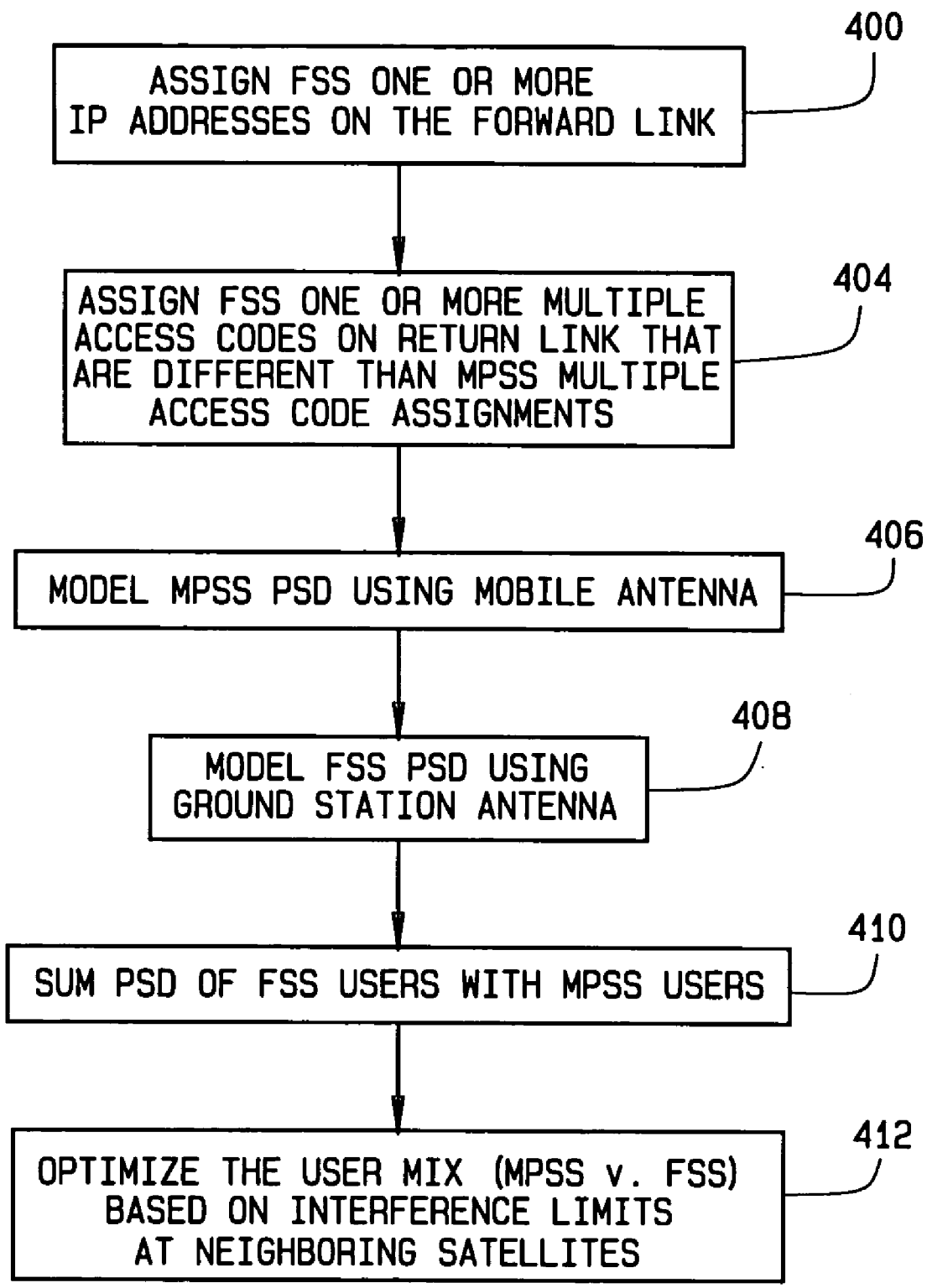
FIG. 8 illustrates steps for combining the MPSS and FSS data services.

Referring now to FIG. 8, the process for combining FSS and MPSS signals are illustrated. As indicated at 400, the FSS station(s) 10 is/are assigned one or more IP addresses on the forward link 58/34 and the MPSS system(s) is/are assigned one or more IP addresses on the forward link 58/70. In other words, the FSS station 10 is treated as if it were one or more MPSS system(s), e.g. MPSS system 98. As indicated at 404, the FSS station 10 is assigned one or more multiple access codes on the return link 32-62 that have not been assigned to the MPSS system 98 of mobile platform 74 on the return link 78/62. The different main lobe and side lobe energy distributions for the MPSS signals and the FSS signals is taken into account such that the FSS signals have a much higher main lobe 352 energy and much lower side lobes 354 and 356 energies.

As indicated at 406, the MPSS PSD is modeled on the return up link 78 based on the mobile platform antenna 72 that is used. As indicated at 408, the FSS PSD is modeled on the return link up link 32 based on the FSS antenna 30 uses. As indicated at 410, the PSDs of FSS and MPSS signals are summed and tracked for the FSS station 10 and/or MPSS system 98 whose signals are superimposed on the same satellite transponder 38. As indicated at 412, the mix of MPSS system 98 and/or FSS station 10 (MPSS signals vs. FSS signals) on any given transponder is determined such that the interference limits at the neighboring transponders is sufficiently utilized while taking full advantage of the bandwidth and dynamic range of the target transponder. In other words, the main lobe and side lobe energies of the MPSS PSD 360 and the FSS PSD 350 are summed so that the main lobe and the side lobe energies of the PSD aggregate 342 are maximized. Therefore, the maximum allowed PSD aggregate 342 is achieved. From a regulatory point of view, the mixed MPSS and FSS service appears identical to the conventional MPSS service where some of the satellite service systems do not move and have very large antennae with very small side lobes.

Design constraints imposed on MPSS, e.g. AMSS, may lead to more interference than an FSS service would produce. Conversely, an FSS service may have a lower interference profile while using more transponder dynamic range. The communication system according to the present invention allows the mixing of MPSS and FSS services such that transponder dynamic range and interference limits are utilized in the most efficient manner.

Therefore, the present invention utilizes access codes such as CDMA or CRMA to allow a mix of both mobile and fixed services on any given transponder to maximize the allowed interference budget at neighboring satellites. Specifically, mobile antennas are typically small such that the usage of a given transponder can not be maximized with mobile platforms alone, which are interference limited. However, fixed services can be added to the same transponder without appreciably increasing the nearest neighbor interference levels. Accordingly, the present invention superimposes mobile and fixed services upon each other, using different codes, e.g. CDMA or CRMA, in the same angular space and same frequency space. Therefore, the fixed service does not need to use the interference budget allowed by neighboring satellites. Thus, the mobile service, which is interference limited due to antenna size limitations, can utilize the unused FSS interference budget.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method for providing broadband communication for a mobile platform, said method comprising:
   providing a first communications link between a mobile platform satellite service (MPSS) system transmitter subsystem (TS) and a target satellite transponder, the first communications link including MPSS data and having a predetermined angular space and frequency space;
   providing a second communications link between a fixed satellite service (FSS) station TS and the target satellite transponder the second communications link including FSS data and having the same angular space and frequency as the first communications link; and
   superimposing the first and second communications links at the target satellite transponder and communicating the superimposed links to a satellite service ground station utilizing at least a portion of an allowed interference budget for the target satellite transponder that is unused by the FSS station TS to provide additional interference budget for the MPSS system TS, thereby maximizing the use of the allowed interference budget of the target satellite transponder with respect to at least one neighboring satellite while maximizing utilization of the target satellite transponder.

2. The method of claim 1, wherein superimposing the first and second communications links comprises utilizing multiple access coding to combine the MPSS data with the FSS data.

3. The method of claim 2, wherein utilizing multiple access coding comprises utilizing at least one of CDMA and CRMA.

4. The method of claim 2, wherein utilizing multiple access coding comprises:
   assigning the FSS station at least one first multiple access code; and
   assigning the MPSS system at least one second multiple access code, wherein the first multiple access code is different than the second multiple access code.

5. The communication system of claim 1, wherein providing the first communications link comprises providing the first communication link within the Ku frequency band between 10.7 and 15.0 GHz.

6. The method of claim 1, wherein providing the first communications link comprises providing the first communication link within the Ka frequency band between 18.0 and 31.0 GHz.

7. The method of claim 1, wherein the method further comprises employing bulk compression on the FSS data and MPSS data using the FSS station TS and the MPSS system TS.

8. The method of claim 1 wherein the method further comprises employing bulk encryption and padding on the FSS data and MPSS data utilizing the FSS station TS and the MPSS system TS.

9. A method for maximizing use of an allowed interference budget of a communications system target satellite transponder with respect to at least one neighboring satellite, said method comprising:
   communicating data signals over a forward link between a mobile platform satellite service (MPSS) system and a target satellite transponder;
   communicating data signals over a forward link between a fixed satellite service (FSS) station and the target satellite transponder;
   determining an aggregate power spectral density (PSD) from a PSD of the MPSS data signals and a PSD of the FSS data signals, the aggregate PSD for communicating data from the target satellite transponder to a ground station;
   superimposing MPSS data with FSS data in a particular ratio then communicating the combined data from the target satellite transponder to the ground station, the ratio of MPSS data to FSS data based on the aggregate PSD such that use of interference limits at the neighboring satellite is maximized and a use of a bandwidth and dynamic range of the target satellite transponder is maximized.

10. The method of claim 9, wherein the method further comprises assigning the FSS station at least one IP address on the forward link between the FSS station and the satellite transponder.

11. The method of claim 9, wherein the method further comprises assigning the FSS station at least one multiple access code on a return link between the target satellite transponder and the FSS station, wherein the multiple access code assigned to the FSS station is different than an access code assigned the MPSS system.

12. The method of claim 11, wherein assigning the FSS station at least one multiple access code comprises assigning the FSS station one of a CDMA and a CRMA code assignment.

13. The method of claim 9, wherein determining the aggregate PSD comprises determining the FSS signal PSD based on an antenna connected to the FSS station.

14. The method of claim 13, wherein determining the aggregate PSD further comprises determining the MPSS signal PSD based on a mobile platform antenna.

15. The method of claim 14, wherein determining the aggregate PSD further comprises summing the FSS signal PSD and the MPSS signal PSD.

16. A method for providing broadband communications for a mobile platform, said method comprising:
   assigning a fixed satellite service (FSS) station at least one IP address on a forward link between the FSS station and a target satellite transponder;
   assigning a mobile platform satellite service (MPSS) system at least one first multiple access code on a return link between the MPSS system and the target satellite transponder;
   assigning the FSS station at least one second multiple access code on the return link between the FSS station and the target satellite transponder, wherein the second multiple access code is different than the first multiple access code;
   determining a FSS signal power spectral density (PSD) based on an antenna connected to the FSS station;
   determining a MPSS signal PSD based on a mobile platform antenna;
   summing the FSS signal PSD and the MPSS signal PSD; and
   superimposing MPSS data and FSS data in a particular ratio then communicating the combined data from the target satellite transponder to a satellite service ground station, the ratio of MPSS data to FSS data based on the aggregate PSD such that use of interference limits at the neighboring satellite is maximized and a use of a bandwidth and dynamic range of the target satellite transponder is maximized,
   superimposing MPSS data with FSS data in a particular ratio then communicating the combined data from the target satellite transponder to the ground station, the ratio of MPSS data to FSS data based on the aggregate PSD such that use of interference limits at the neighboring satellite is maximized and a use of a bandwidth and dynamic range of the target satellite transponder is maximized.

17. The method of claim 16, wherein assigning the FSS station the second multiple access code comprises assigning the FSS station one of a CDMA and a CRMA.

* * * * *